(12) United States Patent
Hsu et al.

(10) Patent No.: US 12,033,499 B2
(45) Date of Patent: Jul. 9, 2024

(54) SYSTEMS AND METHODS FOR PROVIDING ANONYMOUS VEHICLE-TO-VEHICLE COMMUNICATIONS ASSOCIATED WITH TRAFFIC INCIDENTS

(71) Applicant: Verizon Patent and Licensing Inc., Basking Ridge, NJ (US)

(72) Inventors: Sean Hsu, San Francisco, CA (US); Kurt Allen McIntyre, The Colony, TX (US); Brian Peebles, Cranford, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 402 days.

(21) Appl. No.: 17/304,299

(22) Filed: Jun. 17, 2021

(65) Prior Publication Data

US 2022/0406174 A1 Dec. 22, 2022

(51) Int. Cl.
*G08G 1/01* (2006.01)
*G08G 1/0967* (2006.01)
(Continued)

(52) U.S. Cl.
CPC ......... *G08G 1/0141* (2013.01); *G08G 1/0133* (2013.01); *G08G 1/096791* (2013.01); *H04W 4/025* (2013.01); *H04W 4/46* (2018.02)

(58) Field of Classification Search
CPC ............. G08G 1/096791; G08G 1/048; G08G 1/096827; G08G 1/096716; G08G 1/096758; G08G 1/162; G08G 1/22; H04W 12/03; H04W 24/02; H04W 4/02; H04W 12/08; H04W 4/023; H04W 4/029; H04W 64/006; H04W 8/02; H04W 4/46; H04W 12/06; H04W 28/12; H04W 4/021; H04W 4/06; H04W 4/40; H04W 4/44; H04W 4/60; H04W 84/12; H04W 88/06; H04W 88/16; H04W 12/04; H04W 28/0215;
(Continued)

(56) References Cited

U.S. PATENT DOCUMENTS

| 2010/0019932 | A1* | 1/2010 | Goodwin | G08G 1/162 340/902 |
| 2017/0018182 | A1* | 1/2017 | Makled | G08G 1/087 |
| 2018/0219634 | A1* | 8/2018 | Laski | G08G 1/166 |

FOREIGN PATENT DOCUMENTS

| CN | 112351390 A | * | 2/2021 | ........ H04W 12/0471 |
| DE | 19909276 B4 | * | 1/2011 | ........... G08G 1/0965 |

* cited by examiner

*Primary Examiner* — Maceeh Anwari
*Assistant Examiner* — Aarron E Santos

(57) ABSTRACT

A device may receive a message identifying an incident associated with a vehicle and may forgo rebroadcast of the message when the message was previously received. The device may store the message when the message was not previously received and may calculate a distance from the device to the vehicle based on a received power associated with the message. The device may determine whether to stop rebroadcasting the message based on a stop condition and based on the distance or a current location of the device and may calculate a particular coverage area of a rebroadcasted message based on coverage areas of the device and the vehicle. The device may determine, based on not determining to stop rebroadcasting the message and based on the distance or the particular coverage area, a delay time to wait before rebroadcasting the message and may rebroadcast the message after the delay time expires.

20 Claims, 10 Drawing Sheets

(51) Int. Cl.
*H04W 4/02* (2018.01)
*H04W 4/46* (2018.01)

(58) Field of Classification Search
CPC ......... H04W 28/06; H04W 4/30; H04W 4/50;
H04W 40/12; H04W 40/20; H04W 48/08;
H04W 56/001; H04W 56/0055; H04W
56/0065; H04W 72/12; H04W 84/18;
H04W 92/02; H04W 92/18; H04W 4/025;
H04W 4/027; H04W 4/08; H04W 4/185;
H04W 4/80
See application file for complete search history.

SYSTEMS AND METHODS FOR PROVIDING ANONYMOUS VEHICLE-TO-VEHICLE COMMUNICATIONS ASSOCIATED WITH TRAFFIC INCIDENTS

BACKGROUND

Vehicle-to-everything (V2X) refers to an intelligent transport system in which all vehicles and infrastructure are interconnected. Making a V2X system a reality requires provision of vehicle-to-vehicle (V2V) communications.

DETAILED DESCRIPTION OF PREFERRED EMBODIMENTS

Figure 1A:
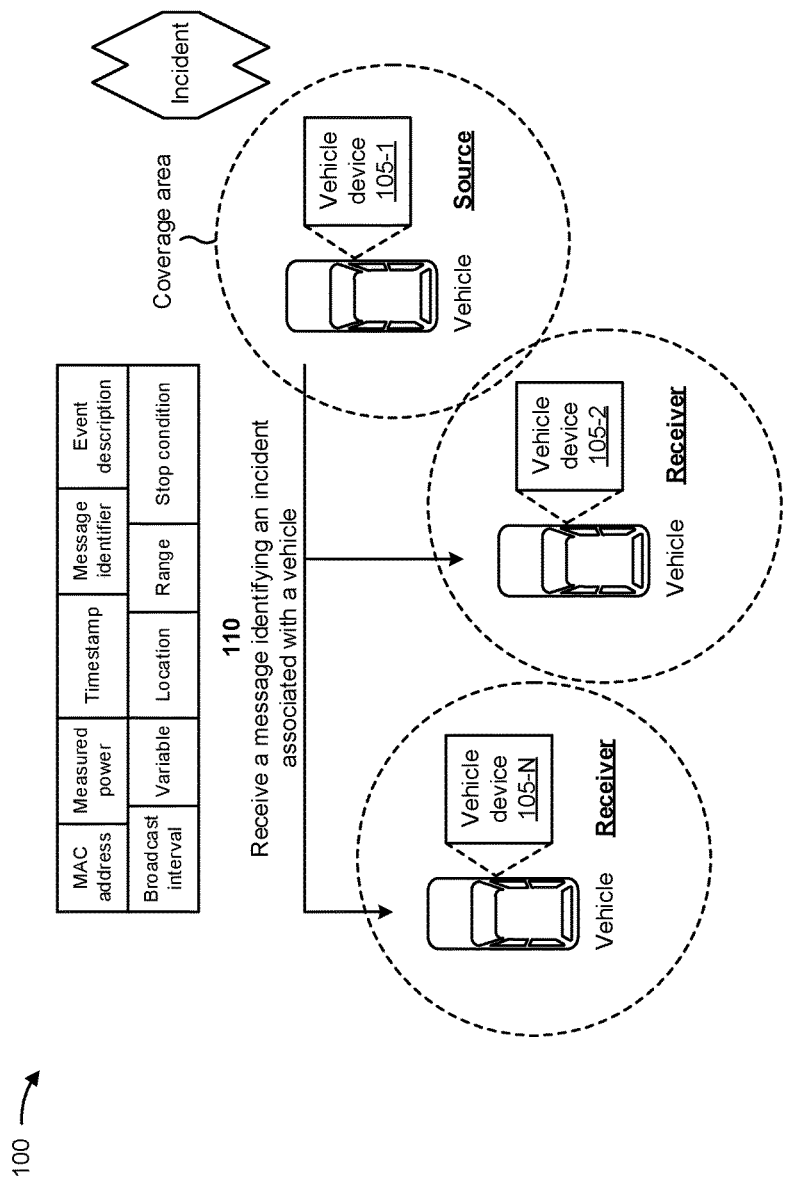
FIGS. 1A-1G are diagrams of an example associated with providing anonymous V2V communications associated with traffic incidents.

The following detailed description of example implementations refers to the accompanying drawings. The same reference numbers in different drawings may identify the same or similar elements.

When a traffic incident (e.g., an accident, a traffic jam, and/or the like) occurs, disseminating information about the incident to neighboring vehicles may be beneficial. However, current V2V communication techniques are unable to adequately provide such information. For example, V2V communications can be facilitated using infrastructure equipment, such as network devices and edge computing devices, but control of the V2V communications is locally centralized in a server device. The centralized server device may experience loss of network connectivity, may create privacy concerns since logs of participants are stored in the server device, may cause security concerns if the server device is compromised, may be costly to maintain for both consumers and network entities, and/or the like. In a pure V2V environment, V2V communications are distributed among vehicles. Unfortunately, pure V2V environments may be unreliable and challenging due to the distributed and mobile nature of vehicles and also due to a lack of standards and accepted protocols associated with communicating in a coordinated manner.

Thus, current V2V communication techniques waste computing resources (e.g., processing resources, memory resources, communication resources, and/or the like), networking resources, and other resources associated with generating insufficient V2V communications after a traffic incident, handling customer complaints associated with the insufficient V2V communications, handling privacy concerns associated with V2V communications, handling security concerns associated with V2V communications, and/or the like.

Some implementations described herein provide vehicle devices that provide anonymous V2V communications associated with traffic incidents. For example, a vehicle device may receive a message identifying an incident associated with a vehicle and may forgo rebroadcast of the message when the message was previously received. The vehicle device may store the message when the message was not previously received and may calculate a distance from the device to the vehicle based on a received power associated with the message. The vehicle device may determine whether to stop rebroadcasting the message based on a stop condition and based on the distance or a current location of the device, and may calculate a particular coverage area of a rebroadcasted message based on a coverage area of the device and a coverage area of the vehicle. The vehicle device may determine, based on the distance or the particular coverage area, a delay time to wait before rebroadcasting the message and may rebroadcast the message after the delay time expires.

In this way, the vehicle devices may provide anonymous V2V communications associated with traffic incidents. The vehicle devices may provide an alerting system using a privacy preserving anonymity scheme and a communication protocol. For example, the vehicle devices may utilize a wireless protocol (e.g., a Bluetooth protocol) to generate secure and anonymous V2V communications. The vehicle devices may exchange V2V communications (e.g., messages) that are reliable and timely, since the messages may be critical for other vehicles, that are efficient so that the vehicles are not inundated with the messages, that are usable with different types of vehicle devices, and that do not rely on external information such as traffic density. Thus, the vehicle devices may conserve computing resources, networking resources, and other resources that would have otherwise been consumed by generating insufficient V2V communications during a traffic incident, handling customer complaints associated with the insufficient V2V communications, handling privacy concerns associated with V2V communications, handling security concerns associated with V2V communications, and/or the like.

FIGS. 1A-1G are diagrams of an example 100 associated with providing anonymous V2V communications associated with traffic incidents. As shown in FIGS. 1A-1G, example 100 includes vehicles and vehicle devices 105-1 through 105-N (also referred to herein singularly as vehicle device 105 and in plurality as vehicle devices 105). A vehicle may include a car, a truck, a motorcycle, an electric bicycle/scooter, a bus, a boat, farm equipment, construction equipment, a mobile robot, an autonomous or human operated vehicle, or a drone, among other examples. In some examples, a vehicle may include an autonomous vehicle, a semiautonomous vehicle, or a non-autonomous vehicle. Further details of the vehicle devices 105 are provided elsewhere herein.

As shown in FIG. 1A, a source vehicle device 105 (e.g., the vehicle device 105-1) may be associated with an incident. The incident may include, for example, an accident, a traffic jam, a police roadblock, and/or the like. The vehicle devices 105 may provide coverage areas, via a wireless communication protocol, in which messages may be transmitted and received among the vehicle devices 105. In some implementations, Bluetooth or a similar technology may be utilized as the wireless communication protocol to perform V2V communications among the vehicle devices 105. Bluetooth may be utilized without network connectivity to communicate among the vehicle devices 105 within a proximity (e.g., approximately eighty meters). This makes Bluetooth a natural medium for transferring local information without having to segment data geographically.

Messages among the vehicle devices 105 may include Bluetooth medium access control (MAC) addresses that may be randomized to avoid tracking from unwanted attackers and to provide anonymity (e.g., privacy) for users of the vehicle devices 105. In addition to being randomized, each of the private addresses may function as a resolvable random private address (RRPA). An RRPA includes a hash and bits of random data used for anonymity. An RRPA hash function may utilize the random data and a key (e.g., a programmable value) to create a hash that may be verified. The key may be shared among the vehicle devices 105 so that the vehicle devices 105 may decipher messages shared (e.g., programmed during manufacture of the vehicle devices 105, provided by a trusted server device, and/or the like) among the vehicle devices 105. In some implementations, the vehicle devices 105 may utilize a stateless broadcast scheme to share the messages among the vehicle devices 105. A stateless broadcast of the messages provides simple, fast, and reliable mechanisms that are as efficient as bulk data (e.g. a stateful approach of building up network structure and disseminating information to all participants). One type of stateless broadcast scheme may include transmitting the messages to all the vehicle devices 105 and ensuring that the vehicle devices 105 will forward the messages to other vehicle devices 105.

As further shown in FIG. 1A, and by reference number 110, the vehicle device 105-1 (e.g., the source vehicle device 105) may generate, and the other vehicle devices 105 (e.g., the receiver vehicle devices 105) may receive, a message identifying the incident associated with a vehicle (e.g., the vehicle associated with the vehicle device 105-1). In some implementations, the vehicle device 105-1 may automatically generate and transmit the message based on the incident. For example, the vehicle device 105-1 may detect the incident and may automatically generate and transmit the message based on detecting the incident.

In some implementations, the message may include data identifying an address (e.g., a MAC address) identifying the vehicle, a power level (e.g., a measured power) associated with a signal that includes the message, a timestamp indicating when the message was transmitted by the vehicle device 105-1, an identifier of the message (e.g., a message identifier), a description of the incident (e.g., an event description), a broadcast interval indicating a time between the message and another message, a variable to be compared with a stop condition, the stop condition specifying when to stop rebroadcasting the message (e.g., may be based on a maximum distance, a quantity of hops, a current location of the vehicle device 105-1, and/or the like), a location of the vehicle device 105-1, a range associated with the signal that includes the message, and/or the like.

In some implementations, the vehicle devices 105 may periodically scan for broadcast messages. When the incident occurs, a trigger may be activated at the vehicle device 105-1 (e.g., the source vehicle device 105). The trigger may be automatically activated by the vehicle device 105-1 based on the incident and may cause the vehicle device 105-1 to periodically advertise the message. A period of time associated with advertising the message may be sufficiently long so that the vehicle device 105-1 may propagate the message to the other vehicle devices 105 without flooding the other vehicle devices 105.

Figure 1B:
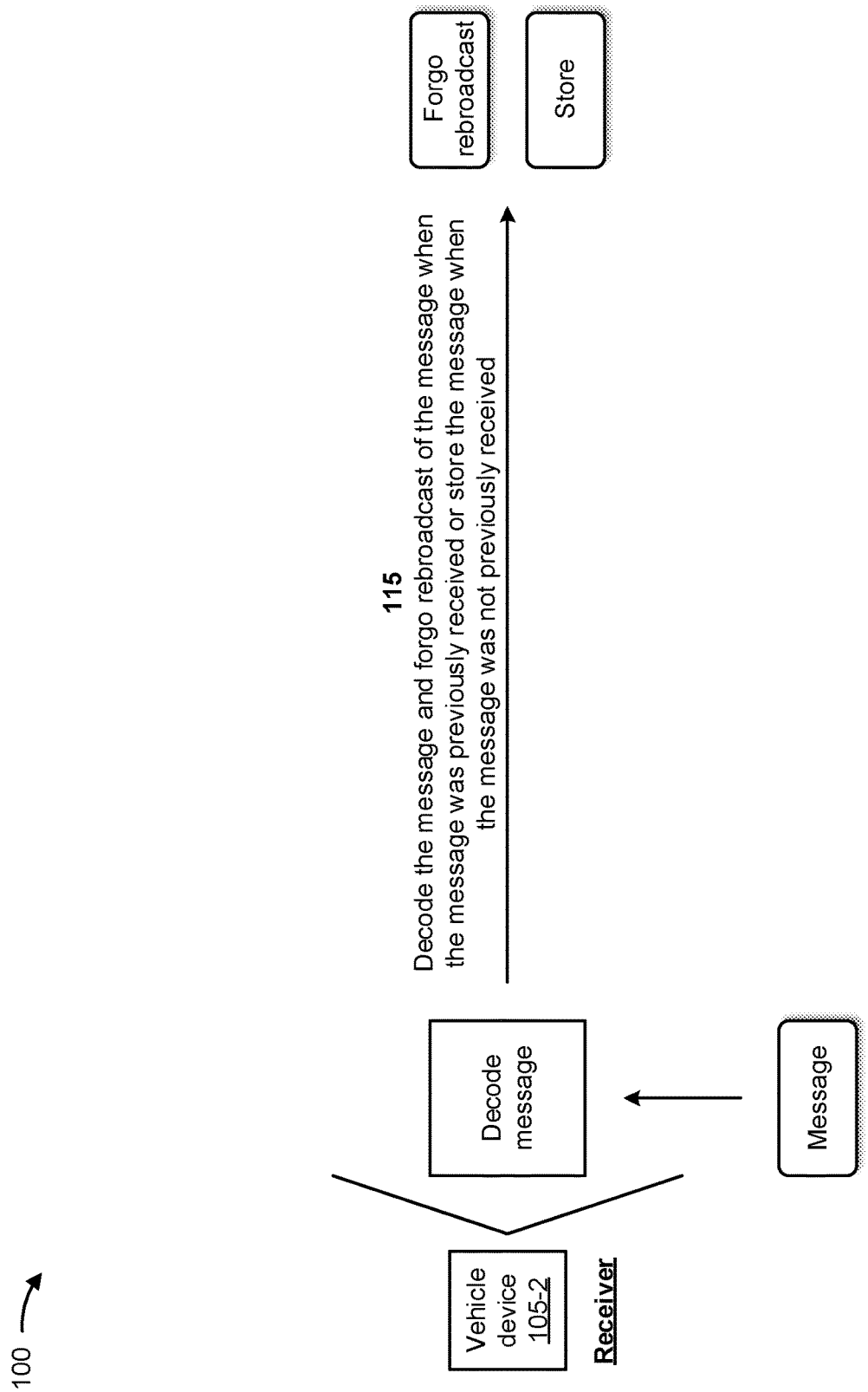

As shown in FIG. 1B, and by reference number 115, the vehicle device 105-2 (e.g., a receiver vehicle device 105) may decode the message and may forgo rebroadcast of the message when the message was previously received or may store the message when the message was not previously received. For example, the vehicle device 105-2 may utilize the key to decode the message and to review content of the message. In some implementations, if the message is not encrypted with the key, the vehicle device 105-2 need not decode the message. The vehicle device 105-2 may determine, based on the content of the message or a message identifier, whether the message was previously received by the vehicle device 105-2. If the message was previously received, the vehicle device 105-2 may forgo rebroadcast of the message to other vehicle devices 105 or may ignore and not process the message. If the message was not previously received, the vehicle device 105-2 may store the message in a storage device (e.g., a buffer) associated with the vehicle device 105-2.

Figure 1C:
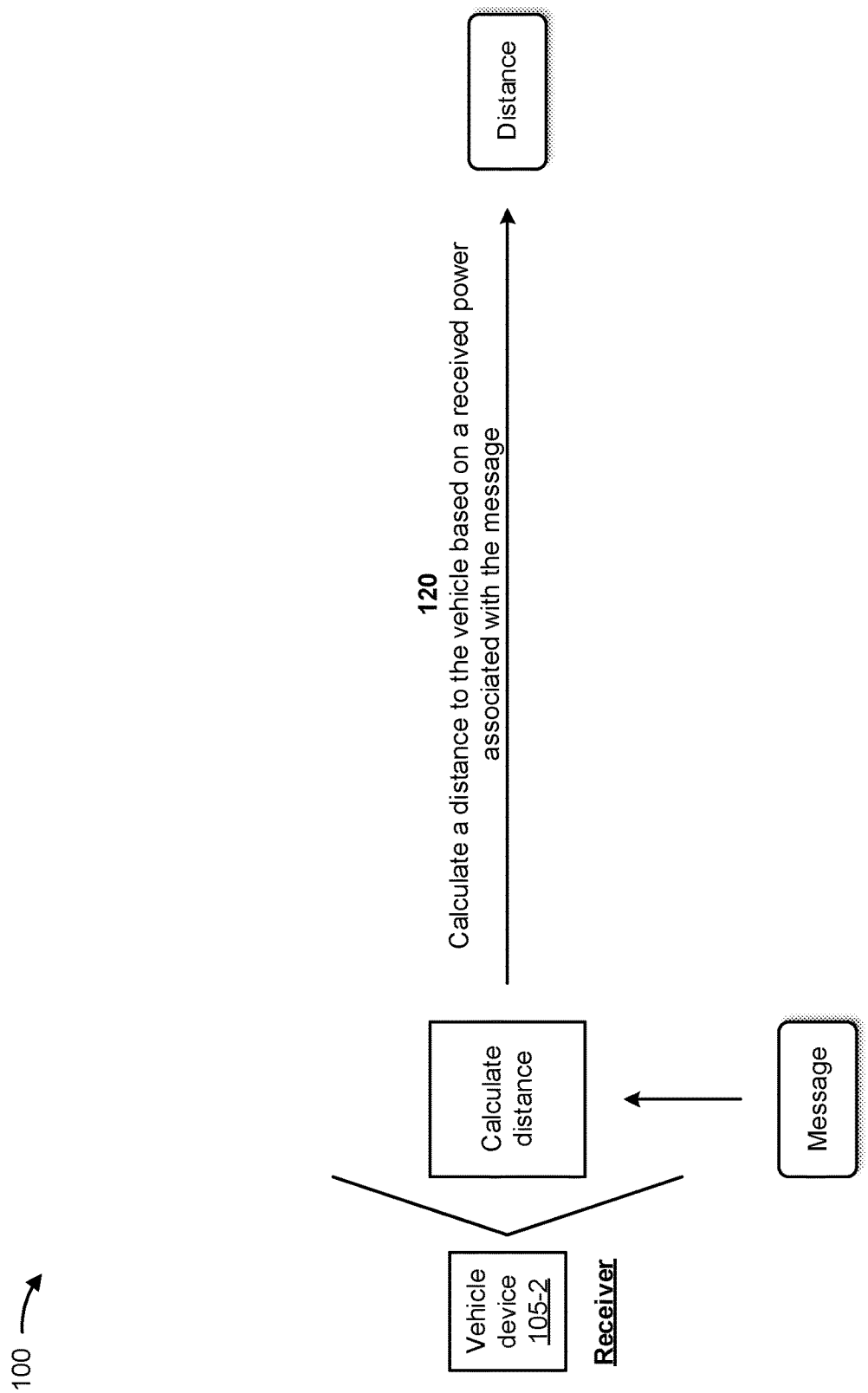

As shown in FIG. 1C, and by reference number 120, the vehicle device 105-2 may calculate a distance to the vehicle and the vehicle device 105-1 based on a received power associated with the message. In some implementations, the vehicle device 105-2 may calculate the distance (D) to the vehicle and the vehicle device 105-1 based on an equation of the form:

$$D = \frac{MP - RSSI}{10 \times N},$$

where D corresponds to the distance between the vehicle device 105-2 and the vehicle (e.g., and the vehicle device 105-1), MP corresponds to a calibrated constant for the vehicle device 105-2, RSSI corresponds to a received signal strength indicator (e.g., a received power) associated with the message, and N corresponds to a constant (e.g., which may be two in free space). In some implementations, the vehicle device 105-2 may receive several RSSI data points while the vehicle device 105-1 is broadcasting the message and may calculate the distance based on an average of the RSSI data points.

Alternatively, or additionally, the vehicle device 105-2 may calculate the distance (D) to the vehicle and the vehicle device 105-1 based on creating and utilizing a regression table to calculate the distance using the RSSI data points and the MP value. The vehicle device 105-2 may utilize the regression table when all of the vehicle devices 105 are the same type of vehicle device since the regression table may require previous data points from a same vehicle device 105 at various distances.

Figure 1D:
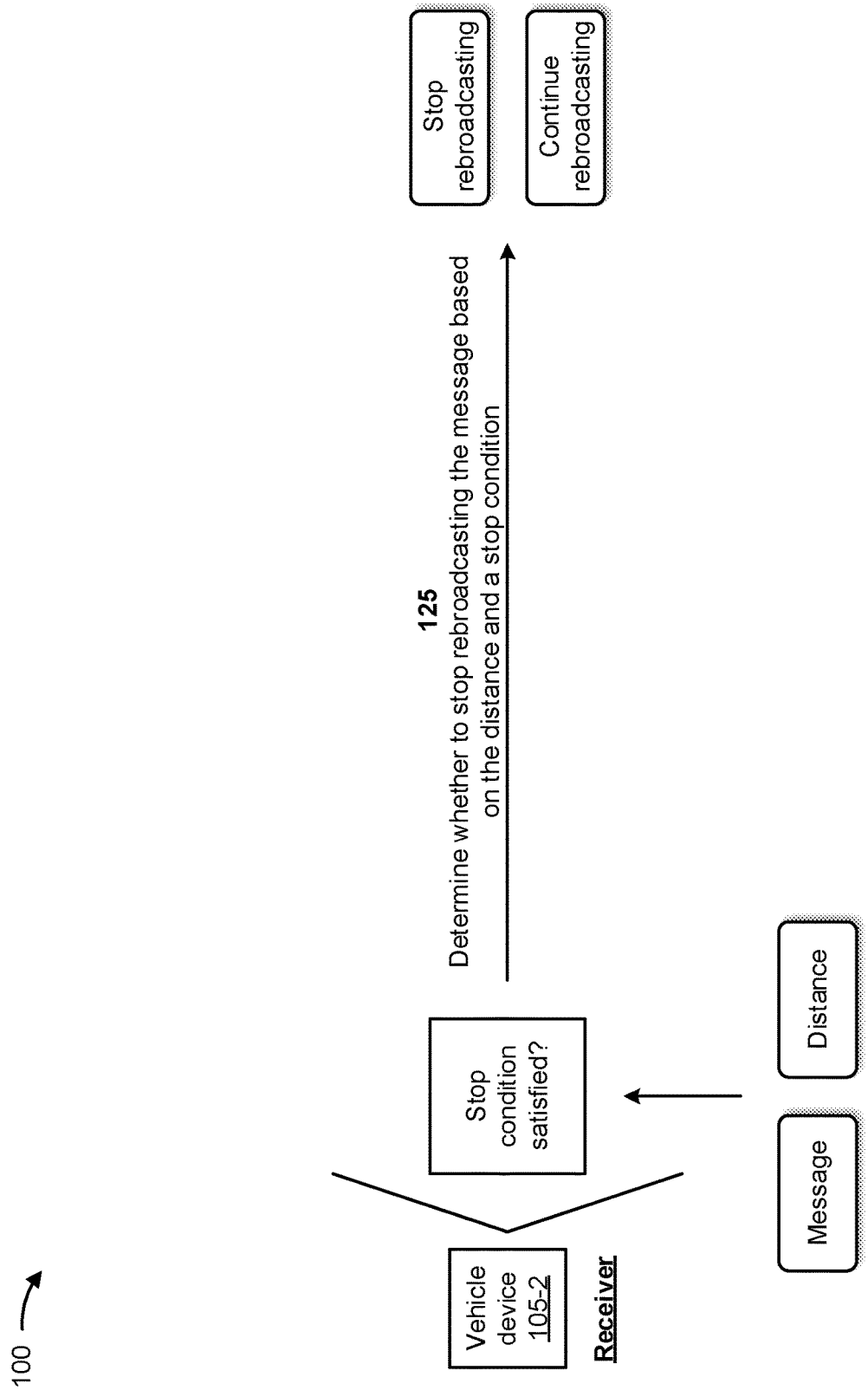

As shown in FIG. 1D, and by reference number 125, the vehicle device 105-2 may determine whether to stop rebroadcasting the message based on the distance and a stop condition. For example, the vehicle device 105-2 may compare a stop variable with the stop condition (e.g., specifying when to stop rebroadcasting the message) to determine whether the vehicle device 105-2 should stop rebroadcasting the message. The stop variable utilized by the vehicle device 105-2 may depend on a type of the stop condition received via the message.

In some implementations, if the stop condition is associated with a maximum distance, the vehicle device 105-2 may add the stop variable and the calculated distance (D) to determine a sum. The vehicle device 105-2 may determine to continue rebroadcasting the message when the sum is less than or equal to the stop condition. The vehicle device 105-2 may determine to stop rebroadcasting the message when the sum is greater than the stop condition.

Alternatively, or additionally, if the stop condition is associated with a maximum quantity of hops (e.g., to a next vehicle device 105), the vehicle device 105-2 may add the stop variable and a constant (e.g., one, two, three, and/or the like) to determine a sum. The vehicle device 105-2 may determine to continue rebroadcasting the message when the sum is less than or equal to the stop condition. The vehicle device 105-2 may determine to stop rebroadcasting the message when the sum is greater than the stop condition.

Figure 1E:
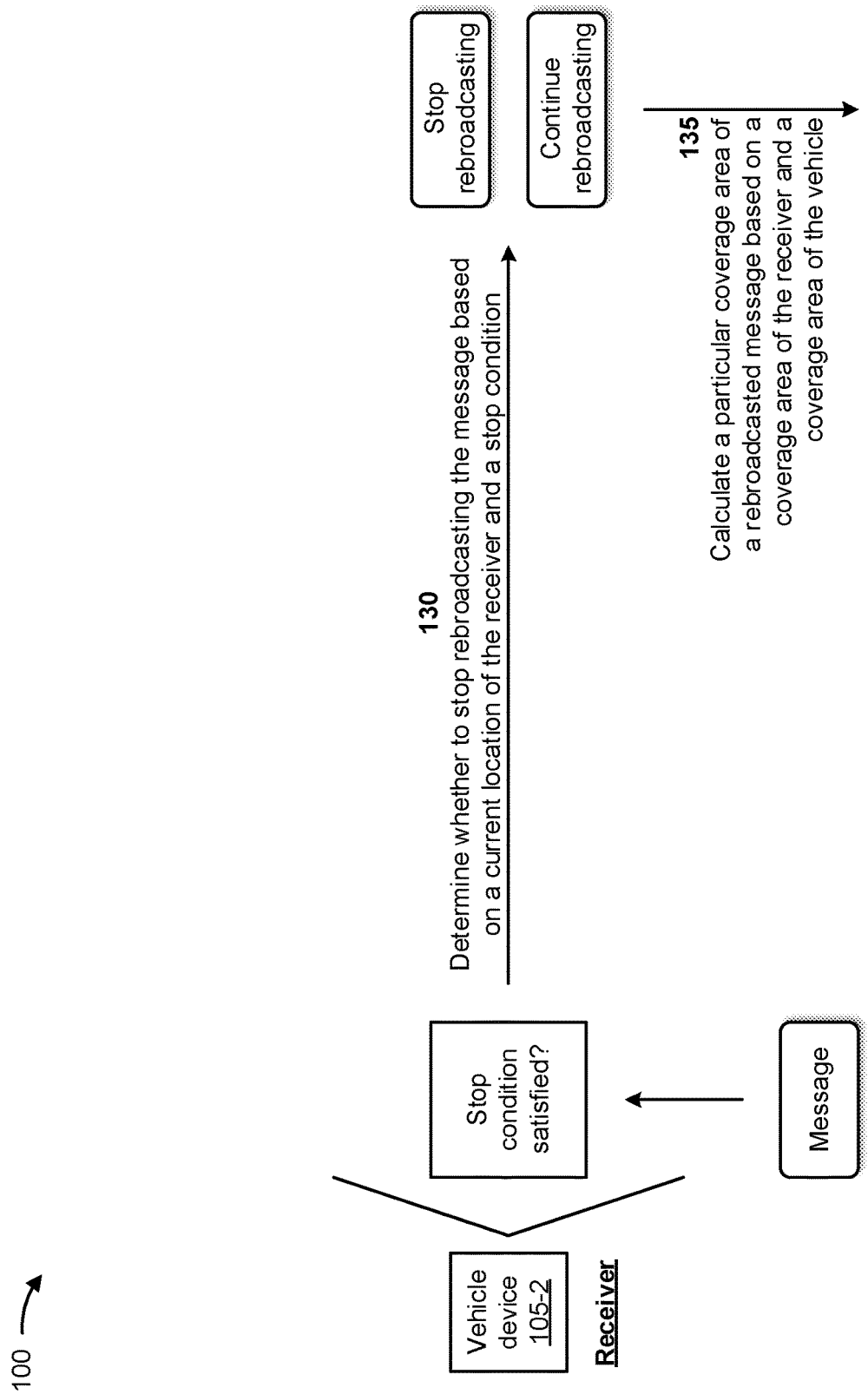

As shown in FIG. 1E, and by reference number 130, the vehicle device 105-2 may determine whether to stop rebroadcasting the message based on a current location of the vehicle device 105-2 and a stop condition. For example, the vehicle device 105-2 may utilize a current latitude and longitude of the vehicle device 105-2 to determine the current location of the vehicle device 105-2. The vehicle device 105-2 may compare the current location of the vehicle device 105-2 to geographical boundaries indicated by the stop condition to determine whether to stop rebroadcasting the message. If the current location of the vehicle device 105-2 is outside the geographical boundaries set forth by the stop condition, the vehicle device 105-2 may stop rebroadcasting the message. If the current location of the vehicle device 105-2 is within the geographical boundaries set forth by the stop condition, the vehicle device 105-2 may continue rebroadcasting the message.

As further shown in FIG. 1E, and by reference number 135, if vehicle device 105-2 determines to continue rebroadcasting the message, the vehicle device 105-2 may calculate a particular coverage area of a rebroadcasted message based on a coverage area of the vehicle device 105-2 and a coverage area of the vehicle (e.g., the vehicle device 105-1). For example, the vehicle device 105-2 may calculate the particular coverage area by subtracting the coverage area of the vehicle device 105-1 (e.g., that overlaps with the coverage area of the vehicle device 105-2) from the coverage area of the vehicle device 105-2 (e.g., based on the current location of the vehicle device 105-2).

In some implementations, the vehicle device 105-2 may calculate the particular coverage area utilizing equations of the form:

$$A_{intersection} = r_1^2 \cos^{-1}\left(\frac{d_1}{r_1}\right) - d_1 \sqrt{r_1^2 - d_1^2} + r_2^2 \cos^{-1}\left(\frac{d_2}{r_2}\right) - d_2 \sqrt{r_2^2 - d_2^2},$$

$$d_1 = \frac{r_1^2 - r_2^2 + d^2}{2d}, d_2 = d - d_1 = \frac{r_2^2 - r_1^2 + d^2}{2d},$$

where $A_{intersection}$ corresponds to the coverage area of the vehicle device 105-1 that overlaps with the coverage area of the vehicle device 105-2, $r_1$ corresponds to a radius of the coverage area of the vehicle device 105-1, $r_2$ corresponds to a radius of the coverage area of the vehicle device 105-2, d corresponds to a distance between a current location of the vehicle device 105-1 and a current location of the vehicle device 105-2, $d_1$ corresponds to a distance between the current location of the vehicle device 105-1 and a midpoint of the coverage of the vehicle device 105-1 that overlaps with the coverage area of the vehicle device 105-2, and $d_2$ corresponds to a distance between the current location of the vehicle device 105-2 and the midpoint of the coverage of the vehicle device 105-1 that overlaps with the coverage area of the vehicle device 105-2.

Figure 1F:
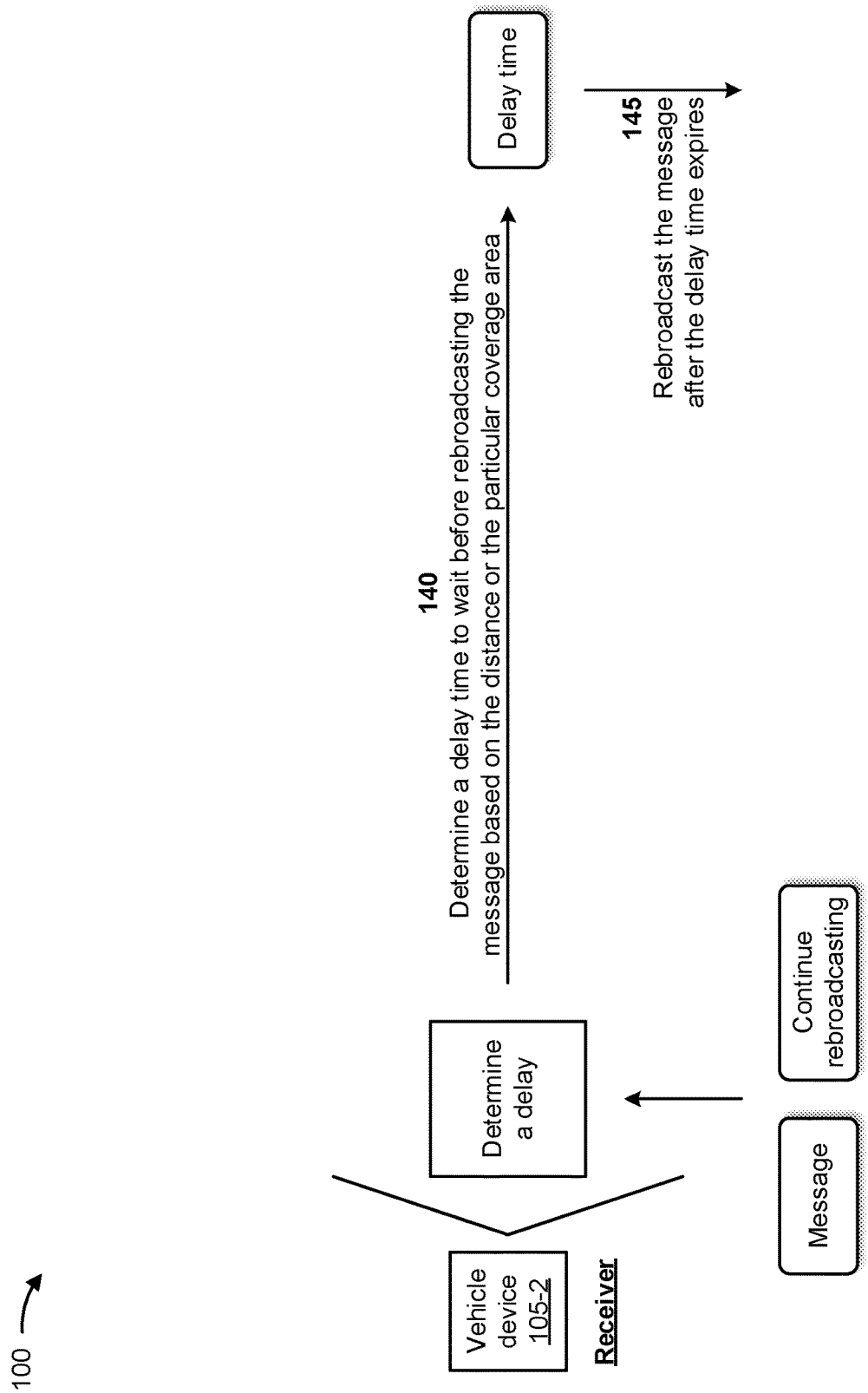

As shown in FIG. 1F, and by reference number 140, the vehicle device 105-2 may determine a delay time to wait before rebroadcasting the message based on the distance or the particular coverage area. For example, the vehicle device 105-2 may determine the delay time based on a delay function to determine how long the vehicle device 105-2 must wait until the vehicle device 105-2 forwards the message. The delay function may include anything that depicts a decreasing time value as distance increases from the vehicle device 105-1. For example, the delay function may include a power law as a distribution choice. An upper bound of the delay function may include a message broadcast interval for the vehicle device 105-1. A minimum quantity of coverage of the delay function may define a boundary point in which rebroadcast of the message will not occur. Once the delay time is determined, the vehicle device 105-2 may utilize the delay time to decide a next course of action. For example, if another message with a same message identifier is received by the vehicle device 105-2 during the delay time, the vehicle device 105-2 may not rebroadcast the message if the calculated distance (D) is less than the minimum quantity of coverage. If a newer message is delivered from the vehicle device 105-1, the vehicle device 105-2 may terminate the message and process the new message immediately.

As further shown in FIG. 1F, and by reference number 145, the vehicle device 105-2 may rebroadcast the message after the delay time expires. For example, if the delay time expires, the vehicle device 105-2 may update broadcast information (e.g., specifically the MP and the current distance) and may forward the updated broadcast information and the message to neighboring vehicle devices 105. The further that neighboring vehicle devices 105 are from the vehicle device 105-2, the faster the vehicle device 105-2 may retransmit the message. Such an arrangement may preempt any vehicle devices 105 that are within proximities of each other and may facilitate a spread of a message to a larger area.

Figure 1G:
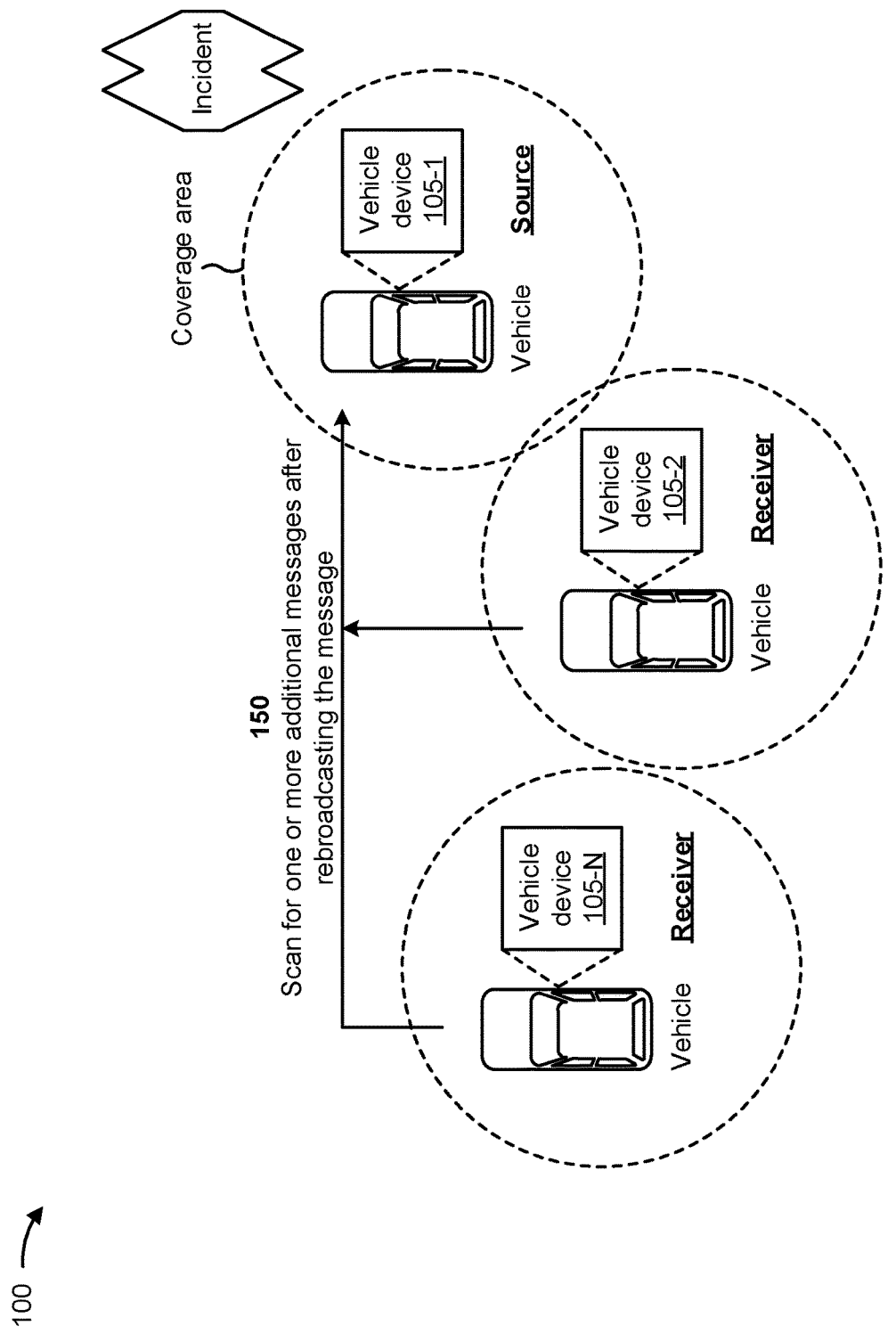

As shown in FIG. 1G, and by reference number 150, the vehicle device 105-2 (e.g., the receiver vehicle device 105) may scan for one or more additional messages after rebroadcasting the message. For example, once the vehicle device 105-2 finishes rebroadcasting the message, the vehicle device 105-2 may switch back to scanning mode to scan for one or more additional messages. In some implementations, the vehicle device 105-2 may receive one or more additional messages based on the scanning. For example, the vehicle device 105-2 may receive another message with a same message identifier as the message before the delay time expires and may forgo rebroadcast of the message based on receiving the other message. In another example, the vehicle device 105-2 may receive another message with a different message identifier than the message and may discard the message based on receiving the other message. The vehicle device 105-2 may process the other message as described above in connection with FIGS. 1B-1F.

As described above, the vehicle devices 105 may provide anonymous V2V communications associated with traffic incidents. For example, the vehicle devices 105 may utilize a wireless protocol (e.g., a Bluetooth protocol) to generate secure and anonymous V2V communications. The vehicle devices 105 may exchange V2V communications (e.g., messages) that are reliable and timely, since the messages may be critical for other vehicles, that are efficient so that the vehicles are not inundated with the messages, that are usable with different types of vehicle devices 105, and that do not rely on external information such as traffic density. Thus, the vehicle devices 105 may conserve computing resources, networking resources, and other resources that would have otherwise been consumed by generating insufficient V2V communications during a traffic incident, handling customer complaints associated with the insufficient V2V communications, handling privacy concerns associated with V2V communications, handling security concerns associated with V2V communications, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
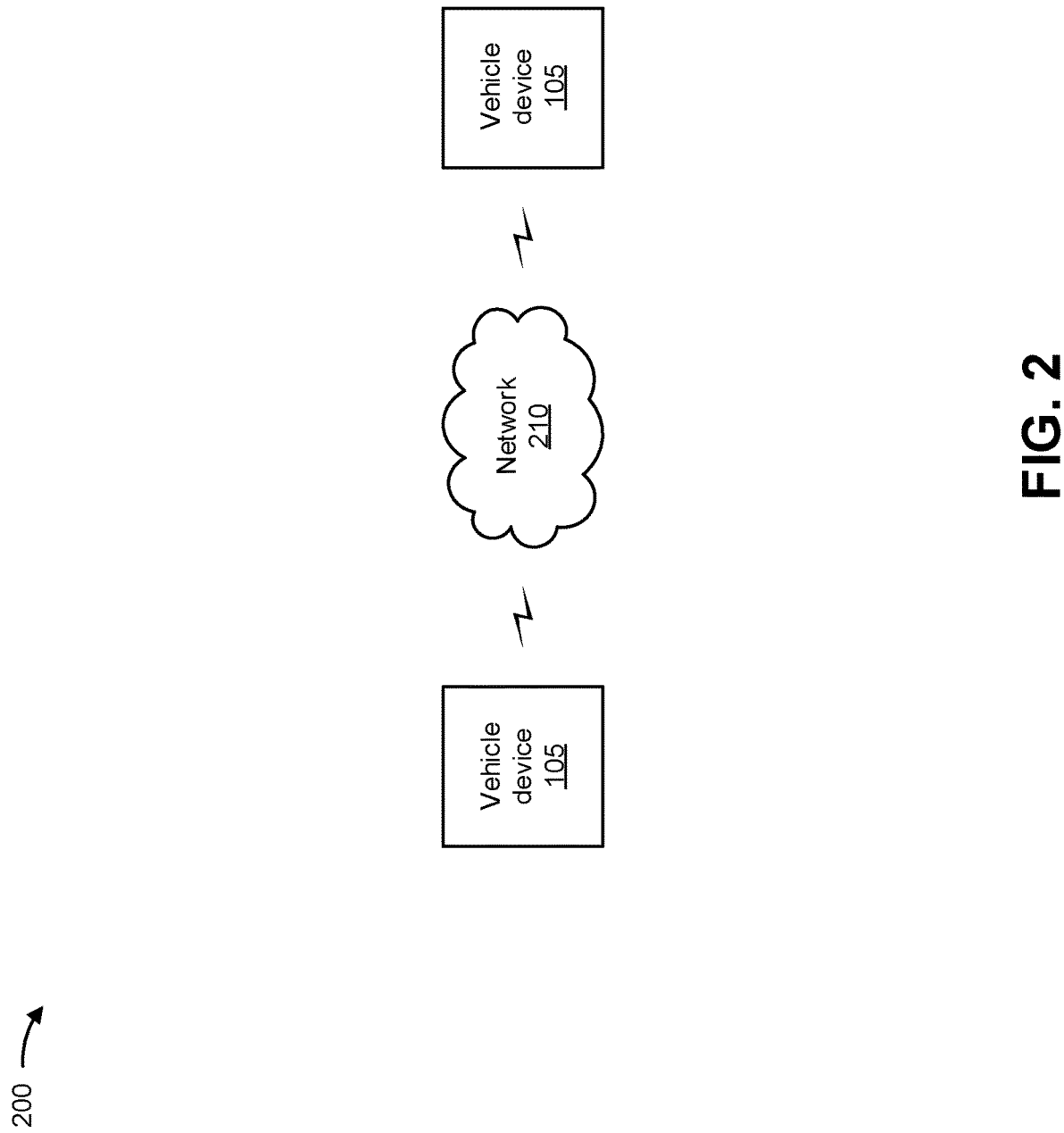
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include the vehicle devices 105 and a network 210. Devices and/or elements of environment 200 may interconnect via wired connections and/or wireless connections.

The vehicle device 105 includes devices capable of receiving, generating, storing, processing, and/or providing information, as described elsewhere herein. The vehicle device 105 may include a communication device and/or a computing device. For example, the vehicle device 105 may include a telematics device, a video camera, a dashboard camera, an inertial measurement unit, a three-axis accelerometer, a gyroscope, a global positioning system (GPS) device, an on-board diagnostics (OBD) device, a vehicle tracking unit, an electronic control unit (ECU), an in-vehicle infotainment system, a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), among other examples.

The network 210 includes one or more wired and/or wireless networks. For example, the network 210 may include a cellular network, a public land mobile network (PLMN), a local area network (LAN), a wide area network (WAN), a private network, the Internet, and/or a combination of these or other types of networks. The network 210 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
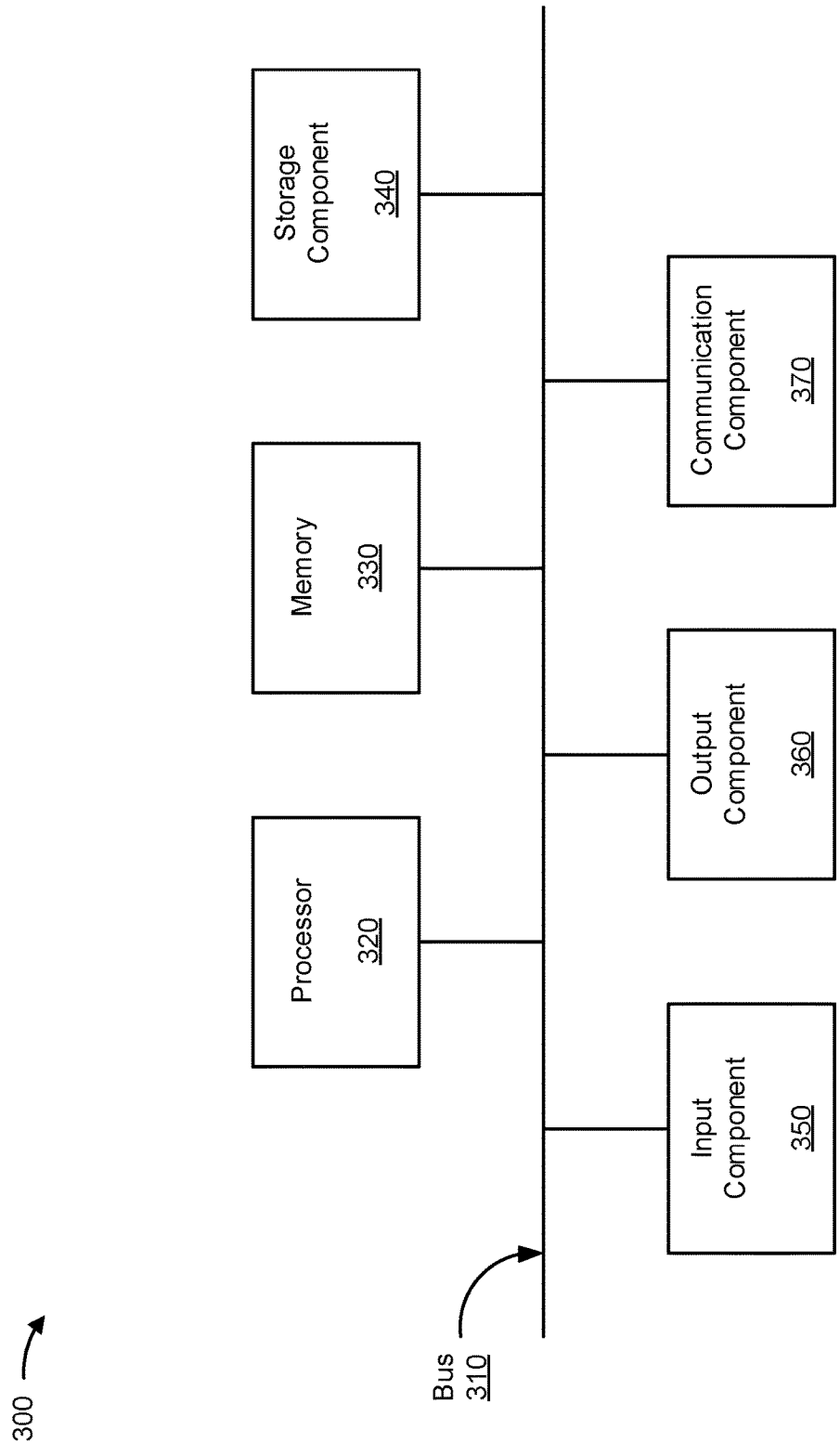
FIG. 3 is a diagram of example components of one or more devices of FIG. 2.

FIG. 3 is a diagram of example components of a device 300, which may correspond to the vehicle device 105. In some implementations, the vehicle device 105 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random-access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
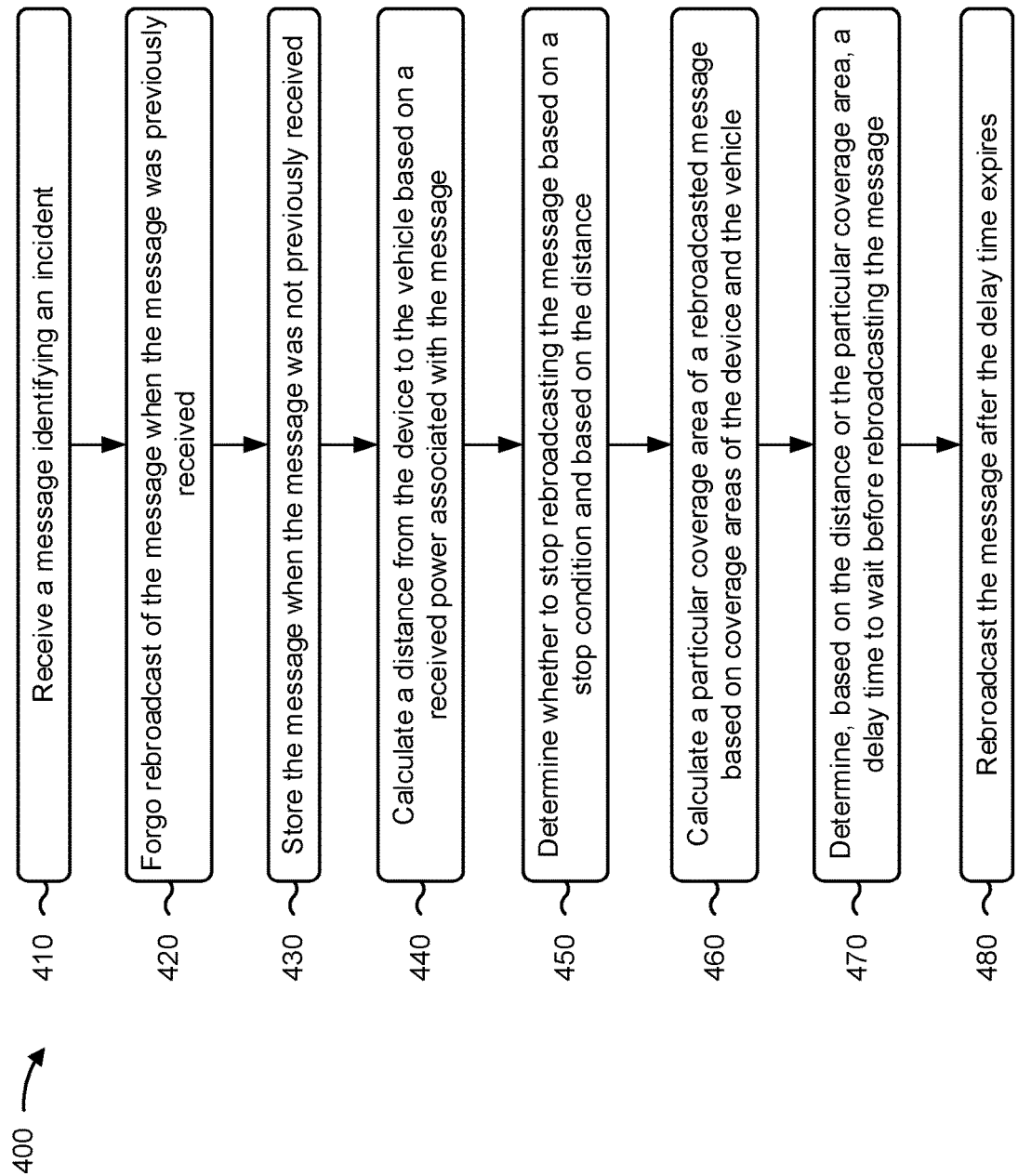
FIG. 4 is a flowchart of an example process for providing anonymous V2V communications associated with traffic incidents.

FIG. 4 is a flowchart of an example process 400 for providing anonymous V2V communications associated with traffic incidents. In some implementations, one or more process blocks of FIG. 4 may be performed by a device (e.g., the vehicle device 105). In some implementations, one or more process blocks of FIG. 4 may be performed by another device or a group of devices separate from or including the device, such as another vehicle device (e.g., the vehicle device 105). Additionally, or alternatively, one or more process blocks of FIG. 4 may be performed by one or more components of the device 300, such as the processor 320, the memory 330, the storage component 340, the input component 350, the output component 360, and/or the communication component 370.

As shown in FIG. 4, process 400 may include receiving a message identifying an incident (block 410). For example, the device may receive a message identifying an incident (e.g., associated with a vehicle, encountered by an operator of the vehicle, and/or the like), as described above. In some implementations, the message is automatically transmitted by the vehicle based on the incident. In some implementations, the message includes data identifying one or more of an address identifying the vehicle, a power level associated with a signal that includes the message, a timestamp indicating when the message was transmitted by the vehicle, an identifier of the message, a description of the incident, a broadcast interval indicating a time between the message and another message, a variable to be compared with the stop condition, the stop condition specifying when to stop rebroadcasting the message, a location of the vehicle, or a range associated with the signal that includes the message.

In some implementations, receiving the message identifying the incident associated with the vehicle includes scanning for messages and receiving the message identifying the incident associated with the vehicle based on scanning for the messages. In some implementations, the message is received via a Bluetooth communication protocol. In some implementations, the message anonymizes an identity of the vehicle and the message includes a resolvable random private address associated with the vehicle.

As further shown in FIG. 4, process 400 may include forgoing rebroadcast of the message when the message was previously received (block 420). For example, the device may forgo rebroadcast of the message when the message was previously received, as described above.

As further shown in FIG. 4, process 400 may include storing the message when the message was not previously received (block 430). For example, the device may store the message when the message was not previously received, as described above.

As further shown in FIG. 4, process 400 may include calculating a distance from the device to the vehicle based on a received power associated with the message (block 440). For example, the device may calculate a distance from the device to the vehicle based on a received power associated with the message, as described above. In some implementations, calculating the distance includes calculating the distance based on a calibrated constant for the device, the received power associated with the message, and a constant in free space As further shown in FIG. 4, process 400 may include determining whether to stop rebroadcasting the message based on a stop condition and based on the distance or a current location of the device (block 450). For example, the device may determine whether to stop rebroadcasting the message based on a stop condition and based on the distance or a current location of the device, as described above. In some implementations, the stop condition is based on one of a maximum distance between the device and the vehicle, a quantity of hops associated with the device and other vehicles, or the current location of the device.

As further shown in FIG. 4, process 400 may include calculating a particular coverage area of a rebroadcasted message based on a coverage area of the device and a coverage area of the vehicle (block 460). For example, the device may calculate a particular coverage area of a rebroadcasted message based on a coverage area of the device and a coverage area of the vehicle, as described above.

As further shown in FIG. 4, process 400 may include determining, based on the distance or the particular coverage area, a delay time to wait before rebroadcasting the message (block 470). For example, when not determining to stop rebroadcasting the message, the device may determine, based on the distance or the particular coverage area, a delay time to wait before rebroadcasting the message, as described above. In some implementations, determining the delay time to wait before rebroadcasting the message includes utilizing a delay function to determine the delay time to wait before rebroadcasting the message, wherein the delay function includes a decreasing time value as the distance increases between the device and the vehicle.

As further shown in FIG. 4, process 400 may include rebroadcasting the message after the delay time expires (block 480). For example, the device may rebroadcast the message after the delay time expires, as described above.

Process 400 may include additional implementations, such as any single implementation or any combination of implementations described below and/or in connection with one or more other processes described elsewhere herein.

In some implementations, process 400 includes decoding the message prior to forgoing the rebroadcast of the message or storing the message. In some implementations, process 400 includes forgoing rebroadcast of the message based on determining to stop rebroadcasting the message. In some implementations, process 400 includes scanning for one or more additional messages from the vehicle after rebroadcasting the message.

In some implementations, process 400 includes receiving another message with a same message identifier as the message before the delay time expires, and forgoing rebroadcast of the message based on receiving the other message. In some implementations, process 400 includes receiving another message with a different message identifier than the message, discarding the message based on receiving the other message, and processing the other message.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code - it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, a message identifying an incident associated with a vehicle;
   forgoing, by the device, rebroadcast of the message when the message was previously received at the device;
   storing, by the device, the message when the message was not previously received at the device;
   calculating, by the device, a distance from the device to the vehicle based on a received power associated with the message;
   determining, by the device, whether to stop rebroadcasting the message based on a stop condition and based on the distance;
   calculating, by the device, a particular coverage area of a rebroadcasted message based on a coverage area of the device and a coverage area of the vehicle;
   determining, by the device when determining to rebroadcast the message, utilizing a delay function that includes a decreasing time value as the distance increases between the device and the vehicle, a delay time to wait before rebroadcasting the message; and
   rebroadcasting, by the device, the message after the delay time expires.

2. The method of claim 1, further comprising:
   decoding the message prior to forgoing the rebroadcast of the message or storing the message.

3. The method of claim 1, wherein calculating the distance comprises:
   calculating the distance based on a calibrated constant for the device, the received power associated with the message, and a constant in free space.

4. The method of claim 1, further comprising:
   scanning for one or more additional messages from the vehicle after rebroadcasting the message.

5. The method of claim 1, wherein the message is automatically transmitted by the vehicle based on the incident.

6. The method of claim 1, wherein the message includes data identifying one or more of:
   an address identifying the vehicle,
   a power level associated with a signal that includes the message,
   a timestamp indicating when the message was transmitted by the vehicle,
   an identifier of the message,
   a description of the incident,
   a broadcast interval indicating a time between the message and another message,
   a variable to be compared with the stop condition,
   the stop condition specifying when to stop rebroadcasting the message,
   a location of the vehicle, or
   a range associated with the signal that includes the message.

7. The method of claim 1, wherein the stop condition is based on one or more of:
   a maximum distance between the device and the vehicle.

8. A device, comprising:
   one or more processors configured to:
      receive a message identifying an incident associated with a vehicle;
      decode the message;
      forgo rebroadcast of the message when the message was previously received or store the message when the message was not previously received;
      calculate a distance from the device to the vehicle based on a received power associated with the message;
      determine whether to stop rebroadcasting the message based on a stop condition and based on the distance;
      calculate a particular coverage area of a rebroadcasted message based on a coverage area of the device and a coverage area of the vehicle;
      determine, based on not determining to stop rebroadcasting the message and utilizing a delay function that includes a decreasing time value as the distance increases between the device and the vehicle, a delay time to wait before rebroadcasting the message; and
      rebroadcast the message after the delay time expires.

9. The device of claim 8, wherein the one or more processors are further configured to:
receive another message with a same message identifier as the message before the delay time expires; and
forgo rebroadcast of the message based on receiving the other message.

10. The device of claim 8, wherein the one or more processors are further configured to:
receive another message with a different message identifier than the message;
discard the message based on receiving the other message; and
process the other message.

11. The device of claim 8, wherein the one or more processors, to receive the message identifying the incident associated with the vehicle, are configured to:
scan for messages; and
receive the message identifying the incident associated with the vehicle based on scanning for the messages.

12. The device of claim 8, wherein the message is received via a Bluetooth communication protocol.

13. The device of claim 8, wherein the message anonymizes an identity of the vehicle and the message includes a resolvable random private address associated with the vehicle.

14. A non-transitory computer-readable medium storing a set of instructions, the set of instructions comprising:
one or more instructions that, when executed by one or more processors of a device, cause the device to:
receive a message identifying an incident associated with a vehicle;
forgo rebroadcast of the message when the message was previously received;
store the message when the message was not previously received;
calculate a distance from the device to the vehicle based on a received power associated with the message;
determine whether to stop rebroadcasting the message based on a stop condition and based on the distance;
calculate a particular coverage area of a rebroadcasted message based on a coverage area of the device and a coverage area of the vehicle;
determine, based on not determining to stop rebroadcasting the message and utilizing a delay function that includes an increasing time value as the distance increases between the device and the vehicle, a delay time to wait before rebroadcasting the message;
rebroadcast the message after the delay time expires; and
scan for one or more additional messages from the vehicle after rebroadcasting the message.

15. The non-transitory computer-readable medium of claim 14, wherein the one or more instructions further cause the device to:
decode the message prior to forgoing the rebroadcast of the message or storing the message.

16. The non-transitory computer-readable medium of claim 14, wherein the one or more instructions further cause the device to:
forgo rebroadcast of the message based on determining to stop rebroadcasting the message.

17. The non-transitory computer-readable medium of claim 14, wherein the one or more instructions further cause the device to:
receive another message with a same message identifier as the message before the delay time expires; and
forgo rebroadcast of the message based on receiving the other message.

18. The non-transitory computer-readable medium of claim 14, wherein the one or more instructions further cause the device to:
receive another message with a different message identifier than the message;
discard the message based on receiving the other message; and
process the other message.

19. The device of claim 8, wherein a minimum quantity of coverage of the delay function defines a boundary point in which rebroadcast of the message will not occur.

20. The non-transitory computer-readable medium of claim 14, wherein a minimum quantity of coverage of the delay function defines a boundary point in which rebroadcast of the message will not occur.

* * * * *